United States Patent
Shealy

[15] 3,659,038
[45] Apr. 25, 1972

[54] HIGH-VOLTAGE VIBRATION RESISTANT TRANSMISSION LINE AND CONDUCTORS THEREFOR

[72] Inventor: Alexander N. Shealy, 701 Mt. Vernon Road, Newark, Ohio 43055

[22] Filed: Jan. 13, 1971

[21] Appl. No.: 106,025

Related U.S. Application Data

[63] Continuation-in-part of Ser. No. 861,806, Sept. 29, 1969, abandoned.

[52] U.S. Cl. ................................174/42, 57/139, 57/145, 174/129 R
[51] Int. Cl. ..............................H02g 7/14, H01b 5/08
[58] Field of Search ..............174/27, 34, 40 R, 41, 42, 43, 174/70 A, 116, 117 R, 128, 129 R, 129 S, 130, 131 R; 57/139, 145, 146, 147, 148

[56] References Cited

UNITED STATES PATENTS 1,999,502  4/1935  Hall....................................174/129 R
2,321,021  6/1943  Dyer, Jr. ...........................174/42 UX

FOREIGN PATENTS OR APPLICATIONS 332,861  7/1930  Great Britain .....................174/129 R
125,286  1/1960  U.S.S.R.............................174/129 R

*Primary Examiner*—Laramie E. Askin
*Attorney*—Paul E. Calrow, James E. Toomey, Harold L. Jenkins and John S. Rhoades

[57] ABSTRACT

Improved vibration and sag resistant overhead transmission line and air-insulated conductor cables therefor. Each conductor cable has an approximately oval or elliptically shaped cross-sectional configuration and it is continuously rotated or twisted about its central axis and along its length whereby the conductor cable, in effect, simulates an air foil that presents an ever changing angle of attack to the cross-winds that occur in the area of installation of the transmission line.

20 Claims, 16 Drawing Figures

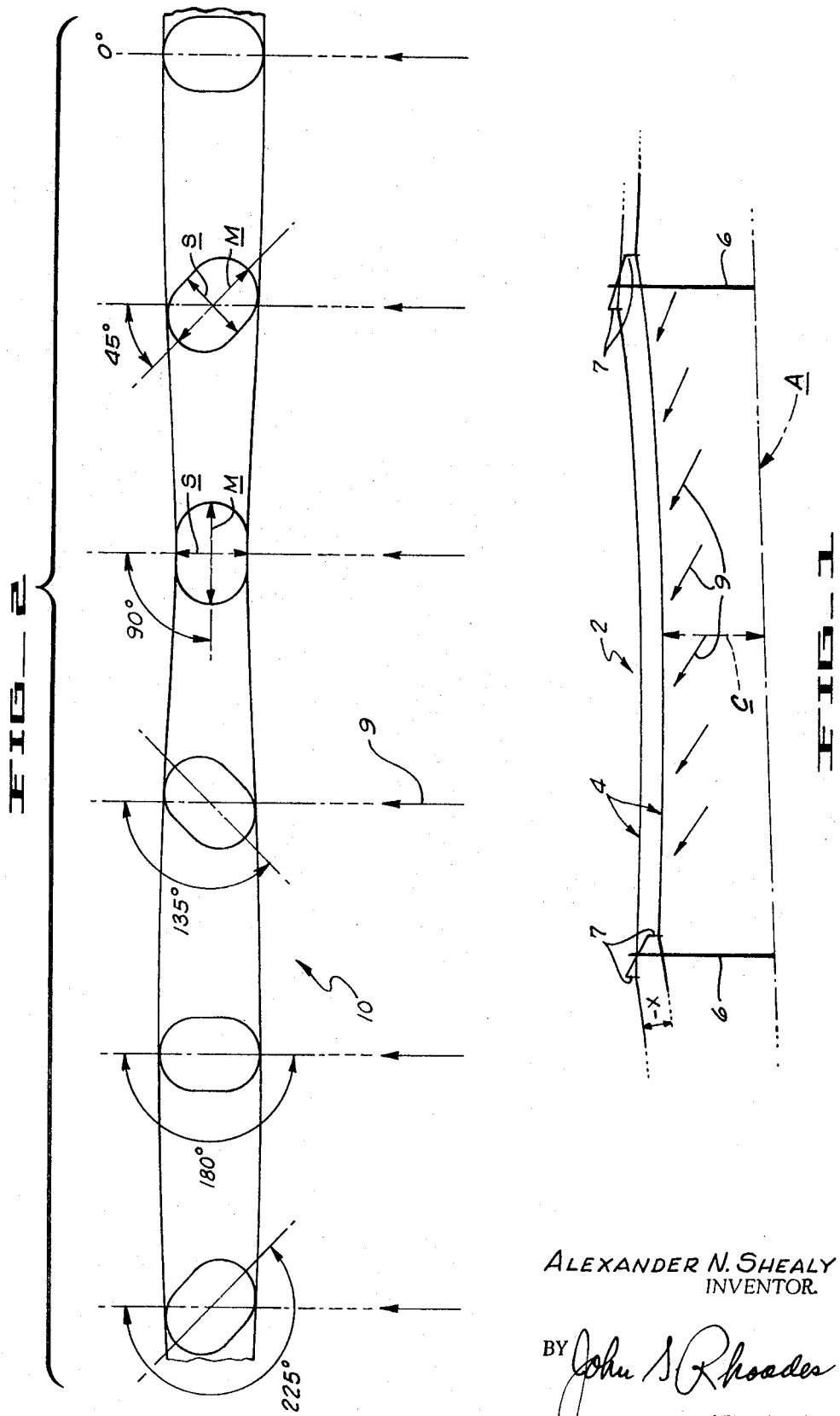

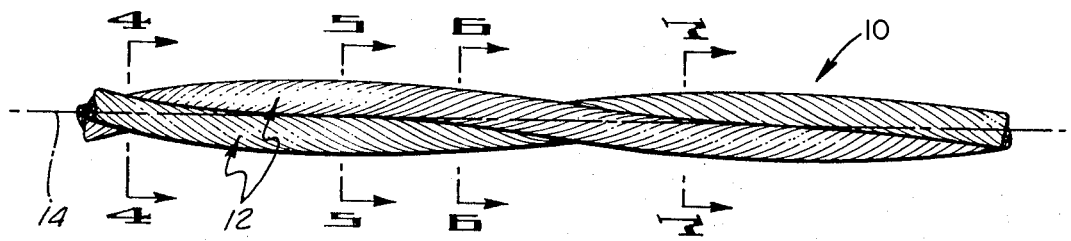
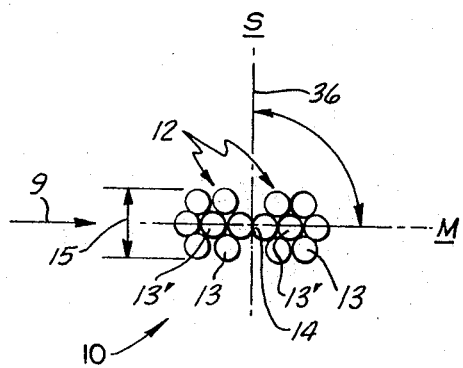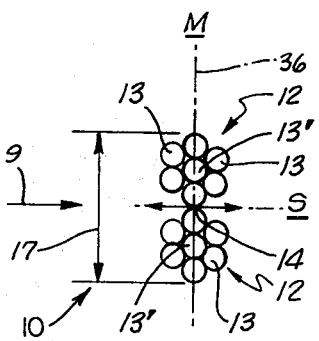
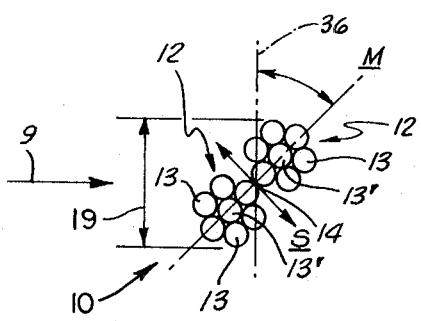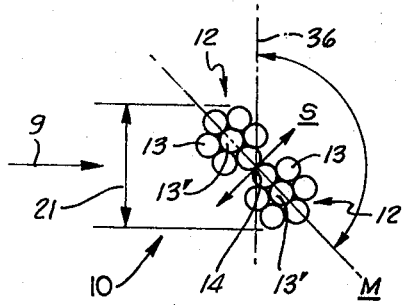

ALEXANDER N. SHEALY
INVENTOR.

BY John R Rhoades
ATTORNEY

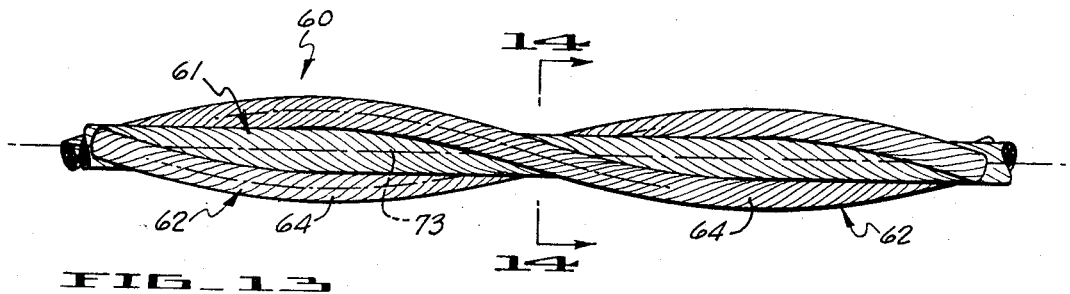
FIG_13
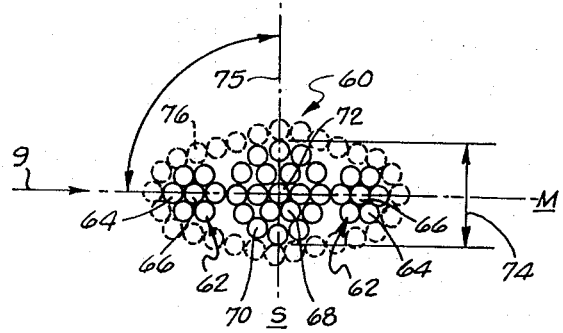
FIG_14
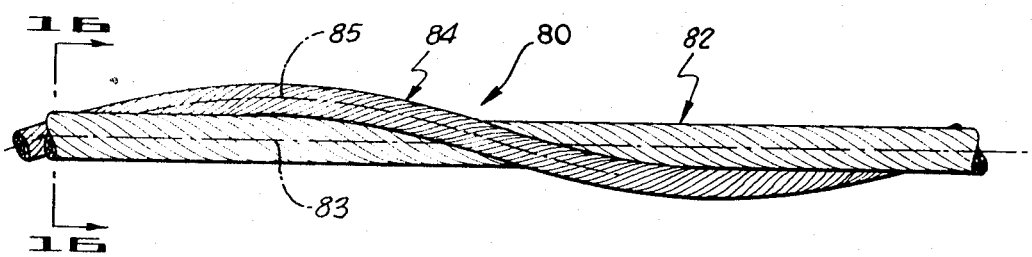
FIG_15
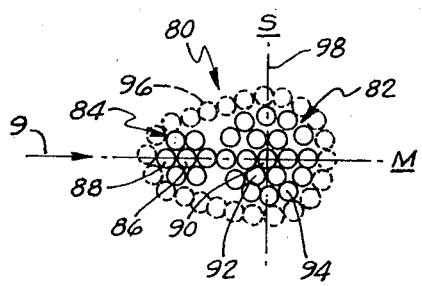
FIG_16
ALEXANDER N. SHEALY
INVENTOR.
BY John S. Rhoades
ATTORNEY

HIGH-VOLTAGE VIBRATION RESISTANT TRANSMISSION LINE AND CONDUCTORS THEREFOR

This application constitutes a continuation-in-part of my copending application Ser. No. 861,806, filed Sept. 29, 1969, now abandoned.

BACKGROUND OF THE INVENTION

This invention relates to electrical overhead transmission lines. More particularly it relates to vibration and sag resistant transmission lines and to air insulated conductor cables therefor.

Various schemes have been proposed in the past for damping or minimizing the vibrations of the electrical conductor cables used in overhead transmission lines. These have comprised self-damping accessories selectively attached to a length of an overhead conductor cable or specially designed conductor cables. Where special accessories have been used, the accessories have increased the overall weight of the conductor cable as well as the overall installation and/or maintenance costs of the transmission lines made up of such conductor cables. In those instances where electrical conductor cables have had a special self-damping construction the cables were usually difficult and expensive or impractical to manufacture and install. Typical prior art anti-vibration conductor cables, etc. for overhead electrical transmission lines having the aforesaid deficiencies are exemplified in U.S. Pat. Nos. 1,999,502 to Hall; 3,204,021 to Adams; 3,296,357 to Greber; and 3,321,569 to Taylor.

The vibration and sag resistant, high voltage transmission line of the present invention is generally comprised of a plurality, e.g., a pair of air insulated conductor cables with each of the conductor cables being made up of individual multistrand conductors and with the various multistrand conductors being tightly disposed and helically twisted together about the common overall axis of the final conductor cable so as to form a cable of elliptical shape in transverse section that has a preselected twist about its common axis between the ends thereof.

The helical twist of an elliptically shaped cable used in a transmission line of the instant invention should be such that the final cable can be inexpensively manufactured on existing or standard equipment and at the same time function in a practical fashion to make the cable advantageously both vibration and sag resistant when installed between a pair of transmission towers and subjected to wind action. Such an air insulated cable is pronouncedly different from a nontwisted conductor cable of the type shown in Russian Pat. No. 125,286 granted as No. 1 in 1960 or a circular and jacketed conductor cable exposed to the wind, even if, segments of the circular cable are helically twisted prior to final assembly of the same into a circular cable to eliminate stresses in the final plastic, rubber or paper jacketed cable as described in British Specification 332,861.

SUMMARY OF THE INSTANT INVENTION

It is the primary purpose of the instant invention to provide an improved, high voltage vibration and sag resistant overhead transmission line as well as improved cables for such a line. The line is generally comprised of at least a pair of air-insulated cables each of which in turn in a preferred embodiment is made up of a pair of multistrand conductors helically and tightly wound about each other. The cables are advantageously spaced apart at a predetermined distance as they are attached to supporting towers.

During manufacture, the individual multistrand conductors are helically and tightly wound about each other and for the length of the cable to form an overall finished cable that approximates an oval or elliptically shaped air foil in transverse section while at the same time having a preselected twist about the common axis thereof. Such a twisted and elliptically shaped finished air insulated cable in effect constitutes an air foil that presents a selected and ever changing angle with respect to the general direction of wind flow across the cable when it is suspended between a pair of support towers whereby wind-induced vibrations are resisted. Because the various components of a cable are tightly wound about each other the cable advantageously exhibits improved structural characteristics as regards minimal elongation and maximum resistance to unraveling and sagging, etc., in addition to resistance to vibrations.

In order to obtain a better understanding of the instant invention, it is believed that a general discussion of wind-induced cable vibrations such as the aeolian-type vibrations and galloping-type vibrations, with which an overhead cable of the present system is concerned, is in order. According to the generally accepted theory suggested a number of years ago by Theodore von Karman, when an overhead cable is exposed to the wind, usually a laminar flow, air vortices or eddies are formed on the leeward side of the cable. These eddies alternate between the top and bottom of the cable on the leeward side thereof in the following manner.

If it is assumed for a given instant that the greater friction between a cable and the air stream occurs at the bottom of the cable, the velocity of the air flow adjacent the bottom thereof will diminish while the pressure at the bottom will increase relative to the pressure at the top thereof. By virtue of such greater pressure at the bottom of the cable, the flow of air adjacent the bottom tends to occupy the rarefied space on the leeward side of the cable, thereby resulting in the formation of an eddy in the geometrical form of a vortex which is commonly called a Karman vortex.

This increase in pressure at the bottom of the cable relative to the top generates a net force which acts in an upward direction at right angles to the wind flow and which tends to lift the cable. The Karman vortex induced at the bottom side of the cable as the result of increased pressure at the bottom thereof also impedes the wind flow across the top of the cable, thereby causing a drop in the velocity of the air flow on the top side of the cable while at the same time causing an increase in the top side pressure. This increase in air pressure on the top side of the cable then causes the formation of another eddy or Karman vortex on the leeward side and top of the cable. This Karman vortex at the top of the cable on the leeward side thereof generates a force in a downward direction toward the bottom of the cable, thereby urging the cable in a downward direction.

The variations in air-cable friction at the bottom and top of the cable as long as the wind blows across a given length of the cable produce alternating eddies or Karman vortices. The alternating Karman vortices generated by a constant velocity wind flow across a cable can initiate cable resonance. As a consequence, wind-induced aeolian vibrations of the cable will occur.

The aeolian vibration of a cable can be mathematically expressed by the mathematical formula $F = 3.26\ D/V$, where $F$ is the frequency of Karman forces in cycles per second occurring along the length of the cable, $V$ is the velocity of the windflow in miles per hour to which a given cable is subjected, $D$ is the diameter or breadth of the cable in inches; and 3.26 is a constant commonly called the Strouhal number. From the above formula for aeolian vibration of a cable it is evident that the frequency change of Karman forces generated across a cable during a given windblow is directly proportional to the velocity of the windblow thereacross and inversely proportional to the diameter thereof.

On the other hand, a turbulent or relatively high velocity windblow across a cable will upon certain occasions also induce a galloping vibration of the cable wherein the galloping vibration is of less frequency than aeolian vibration but of a higher amplitude especially when ice forms about the outer periphery of the cable. Although the phenomena of galloping vibration are not fully understood, present observation and research results appear to indicate that a windblow of a certain velocity or turbulence across the cable can produce a force at the bottom of the cable that not only partially rotates the cable in one direction about its axis but also forces the same in an arcuate path in a generally upward direction. At or near the top of the arcuate movement of the cable its rotation reverses, probably due to torsional forces, and the wind drives it downward. A reversal of this pattern of cable movement then occurs at the bottom of the arcuate path. Thus, depending upon the relatively high velocity or turbulence of a windflow across a conductor, there is caused a sequence of combined rotative and arcuate movements of the cable thereby resulting in a galloping vibration of the cable.

An overhead cable for an overhead transmission line when installed between two towers in a conventional manner is, in effect, an elastic rod, which is analogous to a taut string. If the installed cable is disturbed by certain kinds of wind blow as aforedescribed, the cable will vibrate along its length at various frequencies as long as the wind blows and tend to become loosed from its suspension clamps. The effects of various frequencies of wind-induced vibrations along the length of the cable between the two towers are usually cumulative over a period of time thereby resulting in vibrational damage to the cable such as the ultimate fracture thereof. The particular and unique design of the improved overhead and air insulated cable of the instant application, when used in an overhead transmission line, is of material assistance in preventing harmful wind-induced vibrations and in prolonging useful cable life, as will be further described below.

BRIEF DESCRIPTION OF THE DRAWINGS

FIG. 1 is a diagrammatic and perspective view of a preferred embodiment of the overhead transmission line system of the instant invention which utilizes the improved conductor cable of the instant invention;

FIG. 2 is an enlarged diagrammatic side view of an embodiment of an elliptically shaped conductor cable making up the transmission line system of FIG. 1 and contains a series of enlarged superimposed cross-sectional views of certain portions of the conductor cable which illustrate the continuous, progressive and overall helical rotation or twist of the elliptically shaped conductor cable about its central axis and along its length with respect to the general direction of windflow across the conductor;

FIG. 3 is a fragmentary side view of a typical conductor cable of the instant invention;

FIGS. 4–7 are various representative cross sections taken along various section lines 4—4, 5—5, 6—6 and 7—7, respectively, of the cable illustrated in FIG. 3;

FIG. 13 is a fragmentary side view of still another embodiment of the instant invention;

FIG. 14 is a cross-sectional view of the conductor cable of FIG. 13 when taken along line 14–14 thereof;

FIG. 15 is a fragmentary side elevational view of another embodiment of a conductor cable of the instant invention; and FIG. 16 is a cross section of the conductor cable of FIG. 15 when taken along line 16–16 thereof.

DETAILED DESCRIPTION

Figure 8:
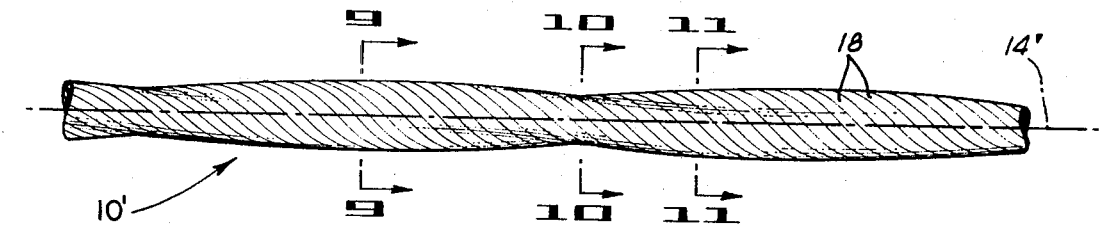
FIG. 8 is a fragmentary side view of another cable embodying the teachings of the instant invention.

The terms "cable" or "conductor cable" as used in the specification and claims are intended to mean an overall or finished large electrical conductor made up of two or more smaller conductors at least one of which is tightly and helically wound about the other. With further reference to the drawings, and particularly to FIG. 1, a preferred embodiment of the instant invention contemplates using the improved vibration and sag resistant cables in an overhead transmission line 2 for transmitting electric current of high voltages on the order, for example, of several hundred kilovolts. Such a line generally comprises a plurality of parallel and spaced, air-insulated, vibration-resistant conductor cables 4, individually supported and suspended between upstanding towers 6 (only two of which are shown) by way of the usual clamp and suspension devices 7. A cable 4 when installed between towers 6, as illustrated in FIG. 1, is subjected along its length to the action of the wind generally indicated by the arrows 9 in FIG. 1. The length of a given cable 4 suspended between adjoining towers 6 must meet certain minimum preselected sag clearances C between an intermediate point of the conductor and the adjacent underlying ground surface A shown in FIG. 1. Continued wind action on the section of conductor cable 4 suspended between the towers can produce harmful vibrations unless the conductor cable 4 is effectively dampened against wind induced vibrations which in addition to causing failure of the cable can produce a loosening of the cable in the areas of clamps 7 and deleterious sagging.

Conductor cables 4 of the instant invention are particularly useful in air insulated electrical cable transmission lines wherein, for example, the installed air insulated individual conductor cables 10 of FIGS. 2–7 advantageously maintain a predetermined air space or gap X between each other. In other words, the conductor cables 10 of FIGS. 2–7 rely on the air as an insulation medium rather than any special rubber, paper or plastic outer jacketing. Maintenance of a predetermined air gap X between conductor cables 10 is critical in preventing interruption in the transmission of electricity along each conductor cable and in preventing flashover or short-circuiting of electrical energy across the gap X from one cable to another. In various operative embodiments of transmission line systems 2 of from 100 to 300 kilovolts, an air gap X on the order of from 5 to 30 feet is ordinarily required.

Various specific embodiments of air insulated conductor cables 10, 10', 10'', 60 and 84 for the typical transmission line of the instant invention are illustrated in FIGS. 2–7, 8–11, 12, 13–14 and 15–16, respectively. Corresponding parts of cables 10 and 10' in FIGS. 2–7 and 8–11, respectively, are all generally identified by like reference numerals and since a pair of conductor cables for a given transmission line 2 are usually of identical construction a description of one such conductor cable, e.g. cable 10, will suffice for both unless otherwise specified, as will now be described below.

As indicated in FIGS. 2–7, one preferred form of air insulated electrical conductor cable 10 embodying the teachings of the instant invention and usable in the transmission line of FIG. 1 is one made up of at least a pair of individual multistranded conductors 12. A conductor 12 can be made up of an odd number of individual strands including a core strand 13' and an outer multistrand layer of individual strands 13 helically and tightly wound about the central core strand.

Core strands 13' of conductors 12 are preferably of the same uniform diameter with respect to each other but can be of a different diameter than the diameter of the strands 13 of the outer strand layer of conductors 12. If desired, strands 13 of the outer layer in one of the separate conductors 12 making up the overall conductor cable 10 can be helically wound in a direction opposite to the direction of the helical winding of the strands of the outer layer of the other conductor 12 for cable 10.

The several conductors 12 making up finished conductor cable 10 are helically and tightly wound about each other and about the common central axis 14 of the cable 10, whereby cable 10 has an approximately elliptical configuration in transverse cross section. The conductor dimension along the major axis M is advantageously maintained at approximately one and one-half to two and one-half times the dimensional extent of the smaller or minor axis S throughout the length of cable 10. Strands 13 making up outer layer and the core strands of the individual conductors can be composed of similar or dissimilar metals. Thus, core strands 13' can be of a high strength aluminum alloy or steel while outer strands 13 can be made of a high electrically conductive grade of aluminum or aluminum alloy and all of which meet the usual ASTM specifications for core and conductor strands in cables of the type under consideration.

As graphically illustrated in FIG. 2, the major axis M of the fully assembled elliptically shaped cable used in the overhead transmission line of the instant invention is twisted or rotated in an improved manner continuously and uniformly about the cable's common or central axis 14 at a rate dependent upon the overall helical pitch of individual conductors 12 as conductors 12 are helically wrapped together about common axis 14 during assembly of the conductors.

As further indicated in FIG. 2, air insulated and finished conductor cable 10 has a rate of twist of about 45° between adjacent illustrated sections of the cable. In order for a fully installed and air-insulated cable of the instant invention such as cable 10 of tower system 2 to have the improved vibration-resistance characteristics, etc. and yet be capable of inexpensive and ready manufacture it has been found that a uniform twist or rotation of the major axis M of the overall fully assembled conductor cable should preferably be on the order of from 2° to 14° per inch of length of the central common cable axis, e.g. axis 14 of cable 10 shown in FIGS. 3-4. As illustrated in FIG. 2, major axis M of an installed cable 10 has a twist of about 3° per inch of length of the cable axis which amounts to about 45° between the adjacent illustrated sections of the cable at axial increments of 1.25 feet.

By virtue of the uniform rate of rotation or twist of the major axis M of a cable of the invention such as cable 10 about a common cable axis 14, cable 10 presents an improved and continuously variable profile along the full length thereof as projected on a vertical plane 36 passing through and coextensive with the common axis of the cable, all as generally indicated in FIGS. 4-7. For purposes of illustration in FIGS. 4-7, plane 36 is shown as being disposed at right angles to the general direction of wind flow, indicated by arrows 9. The major axis M of a given cross section of the cable as shown in FIG. 4 is located in a position 90° clockwise relative to the plane 36, while being coincident with the direction 9 of wind blow so that the profile thickness of the cable section as projected on the vertical plane substantially corresponds to the dimensional extent of the conductor at the minor axis S all as indicated by line 15 in FIG. 4.

In FIG. 5, the major axis M of a cable section has been further rotated clockwise from the position of FIG. 4 to a vertical position in coincidence with the vertical plane 36 whereby the cable section in this area of cable projects a profile height on the vertical plane indicated by line 17 which substantially corresponds to the cable thickness along the major axis thereof. On the other hand, the major axes M of certain other transverse sections of cable 10 along its length have been rotated clockwise from the position of FIG. 5 to different oblique positions on opposite sides of plane 36, all as indicated in FIGS. 6-7. Thus, as indicated by lines 19 and 21 in FIGS. 6-7 respectively, a cable 10 as projected on a plane has a profile height in certain areas that is somewhat less than the dimensional extent of the major axis thereof but greater than the extent of the minor axis thereof.

The air-insulated and tightly twisted cable 10 of elliptical shape shown in FIGS. 2-7 has substantial antivibrational characteristics by virtue of the uniform and constantly changing profile height or thickness it presents to the general direction of wind flow along its length. Since the Karman vortices are a function of the profile thickness of the cable, as hereinbefore described, a continuous and progressive change in profile thickness of the cable of the instant invention as projected on or with reference to a common plane advantageously induces Karman frequencies of varying magnitude along the full length of the suspended air insulated cable 10 which counteract each other so as to effectively prevent the formation of deleterious wind-induced vibrations along any selected section length of such a cable. Thus, also as indicated in FIGS. 2-7, elliptically-shaped final cable 10, by reason of the overall helical rotation of the individual conductors making up the same along the length of the cable, will in effect act like an air foil having an ever changing angle of attack relative to the general direction of a wind flow thereacross whereby the wind-induced force at any point along the length of the cable tends to have an opposing and counteracting force of about the same magnitude at another point along the length thereof, thereby preventing or minimizing galloping cable vibration in the manner aforedescribed and irrespective of whether or not icing of the conductor takes place where the line 2 is installed in cold regions.

A cable with a simple untwisted air foil profile could have serious vibrational problems when installed in cold climates or high altitudes where icing of the cable occurs along with strong cross winds in that the icing can materially change the cable profile as well as the cable reaction to wind blow. Where the cable profile constantly changes, however, as in the instant case, icing problems are of no real concern for all practical purposes.

Adjoining strands 13 and 13 or 13 and 13' of a cable segment 12 of the final cable 10 are held in tight frictional interengagement throughout the length thereof in the manner generally indicated at 15 in FIG. 4 when the outer layer of strands 13 of a conductor 12 are tightly disposed and helically wound about core strand 13' during formation of the conductor or cable segment 12. Similarly, adjacent and opposed outer layer strands 13 of adjoining cable segments 12 of a cable 10 are held in tight abutting engagement throughout the length of the cable and along the common axis 14 thereof. This tight abutting engagement between adjoining strands 13 and 13' of the individual segments 12 of cable 10 as well as between the cable segments themselves tends to keep the cable segments from unraveling and the cable from sagging.

In those instances where a conductor 12 is multistranded the indentations or interstices that occur or are formed as a consequence of the usual stranding procedures act to define or provide a series of air pockets that tend to break up the vortex eddies of cross winds and thereby further enhance the vibration resistant properties of the overall cable 10.

Since the various cable segments 12 are tightly twisted about the main common cable axis 14, the cable 10 exhibits excellent resistance to elongation when suspended between towers 6 while maintaining air foil profile uniformity along the length thereof. The resistance to vibrations in turn also enhances the cable resistance to sagging as aforedescribed. It has been found that for most installation conditions of cable 10 an elongation property of 0.0008 to 0.0012 inch per inch of cable 10 per 1,000 p.s.i. tensile load on the total cable is acceptable. Such elongation properties will also mean that the installed overhead cable depending on its particular kilovoltage specifications can maintain a minimal desirable sag clearance C of from 20 to 30 feet.

In another advantageous embodiment of the invention the modified air insulated and twisted cable 10' of FIGS. 8–11 can comprise a pair of multistranded conductors 12 as aforedescribed helically and tightly wound together about a common cable axis 14' and a pair of multistrand outer layers 16 and 18 also helically wound about the same common axis 14' in order to substantially cover the individual conductors 12 and form a finished cable of approximately elliptical configuration in transverse section. Only one cover layer, e.g. 16 or 18 need be used and inner and outer multistranded layers 16 and 18 are preferably made up of 20 and 26 individual strands respectively of conductive material such as a suitable electrical grade of aluminum or aluminum alloy. Cover layers 16 and 18 can be made up of strands each of the same uniform diameter. Alternatively each of the strands of outer layer 18 could be the same diameter as regards each other but of a different diameter than the strands of layer 16.

As further indicated in FIGS. 8–11 by virtue of the pair of conductors 12 and outer multistranded layers 16 and 18 of cable 10' being helically wound together about common axis 14', major axis M of the cable is disposed in different positions along the length of cable 10' relative to both the general direction of windflow 9 and the vertical plane 40 that is coextensive with and passes through common axis 14' whereby the profile height of a section of cable 10' as projected on the plane 40 is of a different extent along the length thereof. In this connection major axis M of a section of cable 10' along the length of the cable is disposed in coincidence with plane 40 so that the profile height as projected on the plane substantially corresponds to the dimensional extent of the major axis of the cable all in the manner illustrated by line 23 in FIG. 9. It is to be understood that the strands 16 and 18 of inner and outer strand layers of cable 10' are preferably wound about the common axis 14' in reverse helical fashion so as to provide a cable 10' of substantially uniform and twisted elliptical shape throughout the length thereof. It has been found in order for the cable 10' to have the desired outer surface smoothness and resistance to unraveling, that the layer 16 or layer closest to conductor 12 should have strands helically wound in the opposite direction to the winding of the outer strands 13 of conductors 12. Thus care should be exercised to provide for this arrangement during the winding of conductors 12 about each other and layer 16 about conductors 12. The strands of layer 18 are also preferably wound in an opposite direction to the strands of layer 16.

Figure 9:
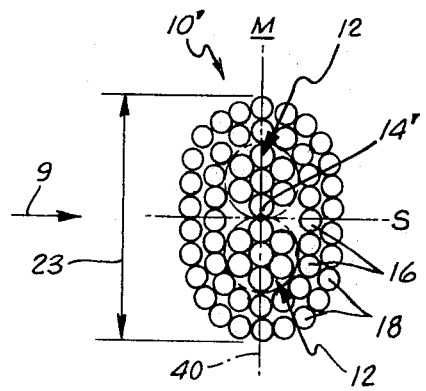
FIGS. 9–11 are various representative cross sections taken along the various section lines 9–9, 10–10, 11–11, of the conductor cable illustrated in FIG. 8.
Figure 10:
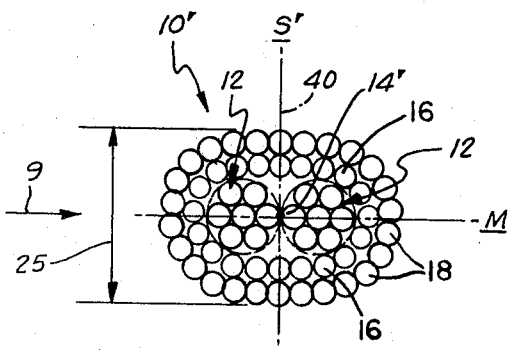
Figure 11:
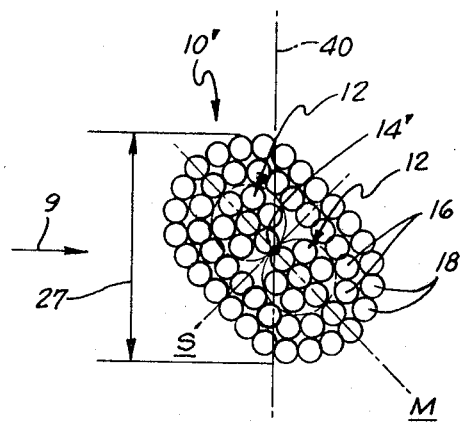

In FIG. 10, major axis M of another section of the cable 10' is shown as having been rotated clockwise from the position of FIG. 9 to a position coincident with the direction of wind 9 such that the cable thickness as projected on plane 40 and as indicated by line 25 in FIG. 10 substantially corresponds to the dimensional extent of the minor axis S of the cable section. In FIG. 11, major axis M of still another section of cable 10' along the length thereof is shown as having been further rotated clockwise to an oblique position relative to the wind and to plane 40 so that the profile thickness of the cable as projected on plane 40 and as indicated by line 27 in FIG. 11 is somewhat less than the dimensional extent of the major axis of the cable but greater than the dimensional extent of its minor axis. Thus, elliptically-shaped cable 10' in being made up of a pair of conductors 12 and inner and outer layers 16 and 18 presents an air foil having an ever changing angle of attack relative to the wind flow as well as a variable profile height when projected on a plane relative to the direction of the wind for effectively resisting wind induced vibrations, all in a similar manner as with the aforedescribed cable 10 of the instant invention.

Figure 12:
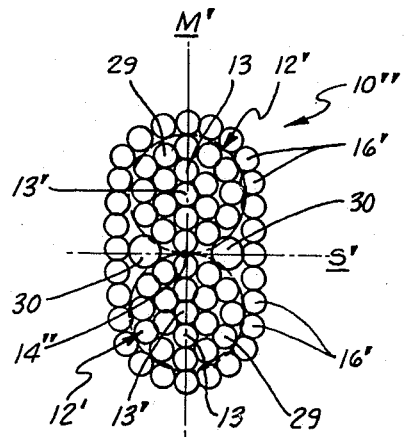
FIG. 12 is a typical cross section of a further multistranded conductor cable that can be used in practicing the instant invention.

A further modified form of an elliptically-shaped cable 10" is shown in FIG. 12. Cable 10" generally comprises a pair of multistrand helically wound conductors 12' and a single multistrand outer cover layer made up of individual strands 16'. The individual strands of the outer cover layer are helically wound and tightly disposed about the outer periphery of the pair of conductors 12' so as to substantially enclose the same in an outer sheath or covering.

Conductors 12' and outer multistrand layer 16' can be helically wound together about common axis 14" of the conductor during the conductor's manufacture. Each individual conductor 12' is preferably made up of an odd number of strands and as compared to conductors 12 of cables 10 and 10' is comprised of two multistrand outer layers of individual strands 13 and 29 respectively helically wound about a core strand 13' for each of the individual conductors 12'. Outermost multistrand layer 29 of each conductor 12' of the final conductor 10" is preferably made up of 12 individual strands. On the other hand, outer multistrand cover layer 16' is preferably made up of 28 individual strands.

If desired, individual filler strands 30, usually of larger diameter than any one of the strands making up conductor 10", can be interposed in the interstices between the pair of conductors 12' and certain strands of the outer layer 16' about the common axis 14" of the conductor 10" along the length thereof. As in the case of cable 10' layer 16' of cable 10" is preferably made up individual wire strands which are helically twisted in an opposite direction to the helical lay of the wire strands 29 of each conductor 12' to provide cable 10" with the desired surface smoothness.

Another advantageous cable embodiment of the present invention is shown in FIGS. 13-14, which illustrate an air insulated sag resistant conductor 60 of approximately elliptical or oval shape in transverse section that contains two outer multistranded conductors 62 and an inner or third conductor 61 interposed between the outer two conductors. Conductor 61 is preferably of larger diameter than either of the outer two conductors 62. Each conductor 62 is made up of an outer multistrand cover layer preferably having six individual strands 64 of an electrically conductive grade of aluminum or an aluminum alloy and a single core strand 66 of high strength aluminum alloy or steel. Conductor 61 is provided with inner and outer multistrand cover layers made up of individual strands 68 and 70 respectively. Core strand 72 of conductor 61 is encompassed by the individual strands of the inner and outer multistrand cover layers. Inner cover layer 68 can be comprised of a first layer of six individual strands of an electrically conductive grade of aluminum or an aluminum alloy which surround a suitable high strength aluminum alloy or steel core strand 72 and an outer cover layer 70 of twelve individual strands of material similar to the strands of layer 68. Core strand 66 of each outer conductor 62 can be of the same or a different diameter than core strand 72 of the inner conductor. Outer cover layers of both conductors 62 can be made up of individual strands of the same diameter. The individual strands of an outer cover layer of a conductor 62 can have the same or a different diameter than the core strand thereof. The individual strands of the inner and outer cover layers 68 and 70 of conductor 61 are preferably of the same diameter. Each layer of the inner and outer cover layers, however, could be made up of individual strands of the same diameter but of a different diameter than the individual strands of the other layer.

In forming each outer conductor 62 of cable 60, the individual strands of an outer cover layer 64 can be helically wound together in either direction about their respective core strand whereby, if desired, the individual strands of the outer cover layer of one conductor 62 can be helically wound about their respective core strand 66 in a reverse direction to the helical winding of the individual outer cover layer strands of the other conductor 62. Similarly, in forming inner conductor 61 of cable 60, inner and outer multistrand cover layers 68 and 70 can be helically wound about core strand 72 in the same or reverse direction. Cable 60 is preferably formed in a suitable manner by helically winding and tightly disposing both outer conductors 62 together about the outer periphery of conductor 61 in such fashion that the diameters of the inner and outer conductors are all aligned and substantially coincident with the major axis M of the cable in the manner illustrated in FIG. 14.

If desired, cable 60 can be sheathed by an overall outer multistrand cover layer 76 in the manner shown in dotted lines in FIG. 14 and made up of an electrically conductive grade of aluminum or an aluminum alloy. Filler strands may be interposed in the usual fashion in the interstices formed between adjacent strands 64 and 70 of the outer cover layers of conductors 62 and 61 respectively.

As in the case of cables 10, 10' and 10" the major axis M of cable 60 gradually and continually rotates relative to the vertical plane 75 that is coextensive with and passes through common axis 73 of the cable at the rate of from 2° to 14° per inch of length of the central cable axis. In FIG. 14 the major axis M of cable 60 is shown as being in a position that is in alignment with the general direction of wind flow 9, thereby projecting a profile length on vertical plane 75 which substantially corresponds to the dimensional extent of minor axis S of the cable as indicated by line 74. Although other sections of cable 60 are not illustrated for the sake of brevity, it is evident in view of the aforedescribed conductor sections of cable 10 depicted in FIGS. 4-7, that various given transverse sections along the length of cable 60 present a varying profile relative to a given plane such as plane 75 as well as varying angles of attack relative to the general direction of a wind flow, thereby effectively inhibiting wind induced vibrations by providing a conductor having anti-vibrational structural characteristics.

As indicated in FIGS. 15-16, a further air-insulated and twisted cable 80 usable in the transmission line 2 of the instant invention generally comprises a first multistranded conductor 82 and a second multistranded conductor 84 of somewhat smaller cross section or diameter than conductor 82. During the overall formation of conductor cable 80, conductor 84 is helically and tightly wound about conductor 82 while being rotated about the axis 83 of conductor 82.

Conductor 84 is made up preferably of a central core strand 86 of high strength steel or aluminum and an outer multistrand cover layer 88 preferably of six individual strands of suitable electrically conductive aluminum or aluminum alloy materials helically and tightly wound together about core strand 86. Conductor 82 is preferably comprised of a single core strand 90 of suitable high strength aluminum or steel materials and inner and outer multistrand cover layers made up of individual strands 92 and 94 respectively of suitable electrically conductive aluminum or aluminum alloys. The individual strands 92 and 94 of inner and outer cover layers of conductor 82 are wound together in the same or reverse direction relative to each other about core strand 90. Inner cover layer is preferably provided with six individual strands 92 and outer cover layer is preferably provided with twelve individual strands 94. By virtue of conductors 82 and 84 being of different diameters the centroid of any longitudinal section of cable 80 is offset from axis 83 of conductor 82 in a direction toward axis 85 of the smaller conductor 84 along the geometrical major axis M of cable 80.

As in the case of cable 10'' of FIG. 12, the outer periphery of conductors 82 and 84 may be substantially covered by an outer multistrand cover layer 96 shown in dotted lines in FIG. 16 and made up of a suitable electrically conductive grade of aluminum or an aluminum alloy. If desired, suitable filler strands may be interposed in the interstices formed between adjacent strands 88 and 94 of the outer cover layers of conductors 84 and 82.

As indicated in FIG. 16, the major axis M of a transverse section of cable 80 has been rotated to a position relative to a vertical plane 98 as well as relative to the general direction of wind flow 9 and the transverse sections of cable 80 are somewhat elliptical or oval shaped. Consequently, cable 80 when used in a transmission line 2 effectively resists wind induced vibrations in a similar manner as set forth in the aforedescribed cable embodiments of FIGS. 2-7, 8-11, 12 and 13-14.

The various cables of FIGS. 2-16 of the instant invention even though being generally of elliptical shape in cross-sectional configuration are structured for ready manufacture by conventional stranding equipment in a suitable fashion. The fact that they are made up of two or more multistranded conductors with or without an outer multistrand cover layer would usually depend upon the electrical capacity requirements of a given conductor and its conditions of installations. Advantageous embodiments of the invention have been shown and described. It will be obvious to those skilled in the art that various changes and modifications can be made therein without departing from the appended claims, wherein:

What is claimed is:

1. A high voltage vibration and sag-resistant electric power transmission line comprised of a plurality of air insulated cables suspended between towers and spaced a predetermined distance apart, each of said cables having a uniform cross section and a continuously varying profile along its length and each of said cables being made up of a plurality of multistranded conductors, at least one of the conductors being continuously and progressively helically and tightly wound about another conductor so as to provide the final cable with a transverse cross section that approximates an elliptically shaped air foil, the major axis of said air foil intersecting while at the same time being progressively rotated about the common central longitudinal axis of the cable for the entire length of the cable so as to define an air insulated cable which in its installed condition in said transmission line has a constantly and uniformly varying profile thickness along its entire length as projected on a vertical plane passing through and coextensive with the said common central longitudinal axis and the extent of the major axis of the cable being on the order of between one and one-half and two and one-half times the extent of the minor axis thereof.

2. A transmission line as set forth in claim 1 wherein the degree of helical twist of a cable along its common central axial length amounts to between 2° to 14° per inch of such axial length.

3. A transmission line as set forth in claim 1 wherein the air insulated cables are spaced apart a distance on the order of from 5 to 30 feet.

4. A transmission line as set forth in claim 1, wherein one of the cables has an elongation characteristic on the order of 0.0008 to 0.0012 in./in. per 1,000 p.s.i. tensile load thereon.

5. A transmission line as set forth in claim 1 wherein the multistranded conductors of at least one of the cables are sheathed in at least one outer layer of electrically conductive strands that are helically and tightly wound about the multistranded conductors.

6. A transmission line as set forth in claim 5 including a filler strand interposed between said multistranded conductors and the outer layer of conductive strands.

7. A transmission line as set forth in claim 1 wherein each cable is made up of a pair of multistranded conductors helically wound about each other with each of said conductors being made up of a core strand and outer conductor strands helically wound about the core strand.

8. A transmission line as set forth in claim 7 wherein the degree of twist of each cable in a line along the cable's common central axial length amounts to between 2° to 14° per inch of such axial length.

9. A transmission line as set forth in claim 1 wherein one of the cables is comprised of a central multistranded conductor and a pair of outer multistranded conductors helically and tightly wrapped about the central conductor.

10. A transmission line as set forth in claim 1 in which the longitudinal centroid of one of the cables is offset relative to the midpoint of the major geometrical axis of the final elliptically shaped cable.

11. A high voltage vibration and sag resistant primarily air insulated power cable, said cable having a uniform cross section and a continuously varying profile along its length, said cable being made up of a plurality of multistranded conductors, at least one of the conductors being continuously and progressively helically and tightly wound about another conductor so as to provide the final and completely finished cable with a transverse cross section that fully approximates an elliptically shaped air foil, the major axis of said air foil intersecting while at the same time being progressively rotated about the common central longitudinal axis of the cable for the entire length of the cable so as to define an air insulated cable which upon installation in a power line maintains a constantly and uniformly varying profile thickness along its entire length as projected on a vertical plane passing through and coextensive with the said common central longitudinal axis and the extent of the major axis of the cable at any given cross section along the entire length of the cable being on the order of between one and one-half and two and one-half times the extent of the minor axis thereof.

12. A power cable as set forth in claim 11 wherein the degree of helical twist of the cable along its common central axial length amounts to between 2° to 14° per inch of such axial length.

13. A power cable as set forth in claim 11 wherein said plurality of multistranded conductors comprises a pair of similarly stranded conductors.

14. A power cable as set forth in claim 11, wherein the cable has an elongation characteristic on the order of 0.0008 to 0.0012 in./in. per 1,000 p.s.i. tensile load thereon.

15. A power cable as set forth in claim 11 wherein the multistranded conductors of the cables are sheathed in at least one outer layer of electrically conductive strands that are helically and tightly wound about the multistranded conductors.

16. A power cable as set forth in claim 15 including a filler strand interposed between the multistranded conductors and the outer layer of conductive strands.

17. A power cable as set forth in claim 11 wherein the cable is made up of a pair of multistranded conductors helically wound about each other with each of said conductors being made up of a core strand and outer conductor strands helically wound about the core strand.

18. A power cable as set forth in claim 17 wherein the degree of twist of the cable in a line along the cable's common central axial length amounts to between 2° to 14° per inch of such axial length.

19. A power cable as set forth in claim 11 wherein the cable is comprised of a central multistranded conductor and a pair of outer multistranded conductors helically and tightly wrapped about the central conductor.

20. A power cable as set forth in claim 11 in which the longitudinal centroid of the cable is offset relative to the midpoint of the major geometrical axis of the final elliptically shaped cable.

* * * * *